(12) United States Patent
Song et al.

(10) Patent No.: US 11,777,181 B2
(45) Date of Patent: Oct. 3, 2023

(54) METAL PLATE FOR RESISTANCE WELDING AND RESISTANCE WELDING METHOD USING THE SAME

(71) Applicant: LG ENERGY SOLUTION, LTD., Seoul (KR)

(72) Inventors: Song Yi Song, Daejeon (KR); Heung Kun Park, Daejeon (KR); Ju Hwan Baek, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 113 days.

(21) Appl. No.: 17/441,378

(22) PCT Filed: Sep. 22, 2020

(86) PCT No.: PCT/KR2020/012739
§ 371 (c)(1),
(2) Date: Sep. 21, 2021

(87) PCT Pub. No.: WO2021/091081
PCT Pub. Date: May 14, 2021

(65) Prior Publication Data
US 2022/0190449 A1    Jun. 16, 2022

(30) Foreign Application Priority Data

Nov. 6, 2019    (KR) .................. 10-2019-0140885

(51) Int. Cl.
*H01M 50/566*    (2021.01)
*H01M 50/107*    (2021.01)

(52) U.S. Cl.
CPC ....... *H01M 50/566* (2021.01); *H01M 50/107* (2021.01)

(58) Field of Classification Search
CPC .................. H01M 50/566; H01M 50/107
See application file for complete search history.

(56) References Cited

U.S. PATENT DOCUMENTS

2004/0266252 A1    12/2004    Sato
2005/0284654 A1    12/2005    Sato
(Continued)

FOREIGN PATENT DOCUMENTS

CN    1575110 A    2/2005
CN    1728433 A    2/2006
(Continued)

OTHER PUBLICATIONS

KR20190114107A translation (Year: 2019).*
International Search Report (PCT/ISA/201) issued in PCT/KR2020/012739, dated Jan. 6, 2021.

*Primary Examiner* — Jane J Rhee
(74) *Attorney, Agent, or Firm* — Birch, Stewart, Kolasch & Birch, LLP (57) ABSTRACT

Discussed are a metal plate for resistance welding and a resistance welding method using the same, wherein the metal plate is for being resistance-welded to an electrode terminal of a cylindrical battery, and the metal plate includes a body; and a pair of protrusion units located spaced apart from each other by a predetermined distance, the pair of protrusion unit being provided at one side surface of the body, and a slit is formed between the pair of protrusion units.

9 Claims, 6 Drawing Sheets

(56) References Cited

U.S. PATENT DOCUMENTS

| | | |
|---|---|---|
| 2006/0057457 A1 | 3/2006 | Bang |
| 2009/0233174 A1* | 9/2009 | Okabe ................. H01M 50/538 |
| | | 429/223 |
| 2015/0086834 A1 | 3/2015 | Cho |
| 2016/0301056 A1 | 10/2016 | Yi |
| 2016/0344011 A1 | 11/2016 | Ogawa et al. |
| 2019/0386353 A1 | 12/2019 | Jang et al. |
| 2020/0280040 A1 | 9/2020 | Lee et al. |
| 2020/0321595 A1 | 10/2020 | Kim |

FOREIGN PATENT DOCUMENTS

| | | |
|---|---|---|
| CN | 110383535 A | 10/2019 |
| JP | 8-266603 A | 10/1996 |
| JP | 2006-239709 A | 9/2006 |
| JP | 2007-66537 A | 3/2007 |
| JP | 2009-252350 A | 10/2009 |
| JP | 2013-20860 A | 1/2013 |
| JP | 2016-110772 A | 6/2016 |
| JP | 2016-219270 A | 12/2016 |
| JP | 2017-164771 A | 9/2017 |
| KR | 10-2015-0033783 A | 4/2015 |
| KR | 10-2016-0120996 A | 10/2016 |
| KR | 10-2017-0135062 A | 12/2017 |
| KR | 10-2017-0142659 A | 12/2017 |
| KR | 10-2019-0114107 A | 10/2019 |
| KR | 10-2019-0122407 A | 10/2019 |
| WO | WO 2019/203426 A1 | 10/2019 |

\* cited by examiner

METAL PLATE FOR RESISTANCE WELDING AND RESISTANCE WELDING METHOD USING THE SAME

TECHNICAL FIELD

This application claims the benefit of Korean Patent Application No. 2019-0140885 filed on Nov. 6, 2019, the disclosure of which is hereby incorporated by reference herein its entirety.

The present invention relates to a metal plate for resistance welding and a resistance welding method using the same, and more particularly to a metal plate for resistance welding configured to electrically interconnect cylindrical batteries used in a mobile electronic device, a vehicle, etc. and a resistance welding method using the same.

BACKGROUND ART

With technological development of mobile devices, such as mobile phones, laptop computers, camcorders, and digital cameras, and an increase in the demand therefor, research on secondary batteries, which are capable of being charged and discharged, has been actively conducted. In addition, secondary batteries, which are energy sources substituting for fossil fuels causing air pollution, have been applied to an electric vehicle (EV), a hybrid electric vehicle (HEV), and a plug-in hybrid electric vehicle (P-HEV), and therefore there is an increasing necessity for development of secondary batteries.

There are a nickel-cadmium battery, a nickel-hydride battery, a nickel-zinc battery, and a lithium secondary battery as currently commercialized secondary batteries. Thereamong, the lithium secondary battery is in the spotlight, since the lithium secondary battery has little memory effect, whereby the lithium secondary battery is capable of being freely charged and discharged, has a very low self-discharge rate, and has high energy density, compared to the nickel-based secondary batteries.

When used in a device requiring large capacity and high voltage, such as an electric vehicle, the secondary battery described above is used in the form of a battery cell assembly or a battery pack having a structure in which a plurality of battery cells is arranged.

Meanwhile, a secondary battery is generally classified as a pouch-shaped battery, a cylindrical battery, or a prismatic battery based on the shape of a battery case. Thereamong, the cylindrical battery exhibits higher safety than other battery types, since a metal case is formed so as to have a cylindrical structure. In addition, since an electrode assembly, which is mounted in the case, is manufactured in the state of being wound in a circle, energy density per unit volume of the cylindrical battery is high, and a plurality of batteries can be connected to each other in series or in parallel in order to manufacture a large-capacity power storage apparatus.

The cylindrical battery has a structure in which a positive electrode terminal and a negative electrode terminal are provided at the upper surface and the lower surface of the cylindrical battery, respectively, so as to be connected to a negative electrode terminal and a positive electrode terminal of another battery in series or in parallel. In general, the positive electrode terminal has a structure protruding from the battery, and the negative electrode terminal has an approximately flat structure. In order to stably connect the positive electrode terminal and the negative electrode terminal to each other, therefore, an electrically conductive metal, such as a lead, i.e. a metal plate, is resistance-welded to the positive electrode terminal or the negative electrode terminal.

Figure 1:
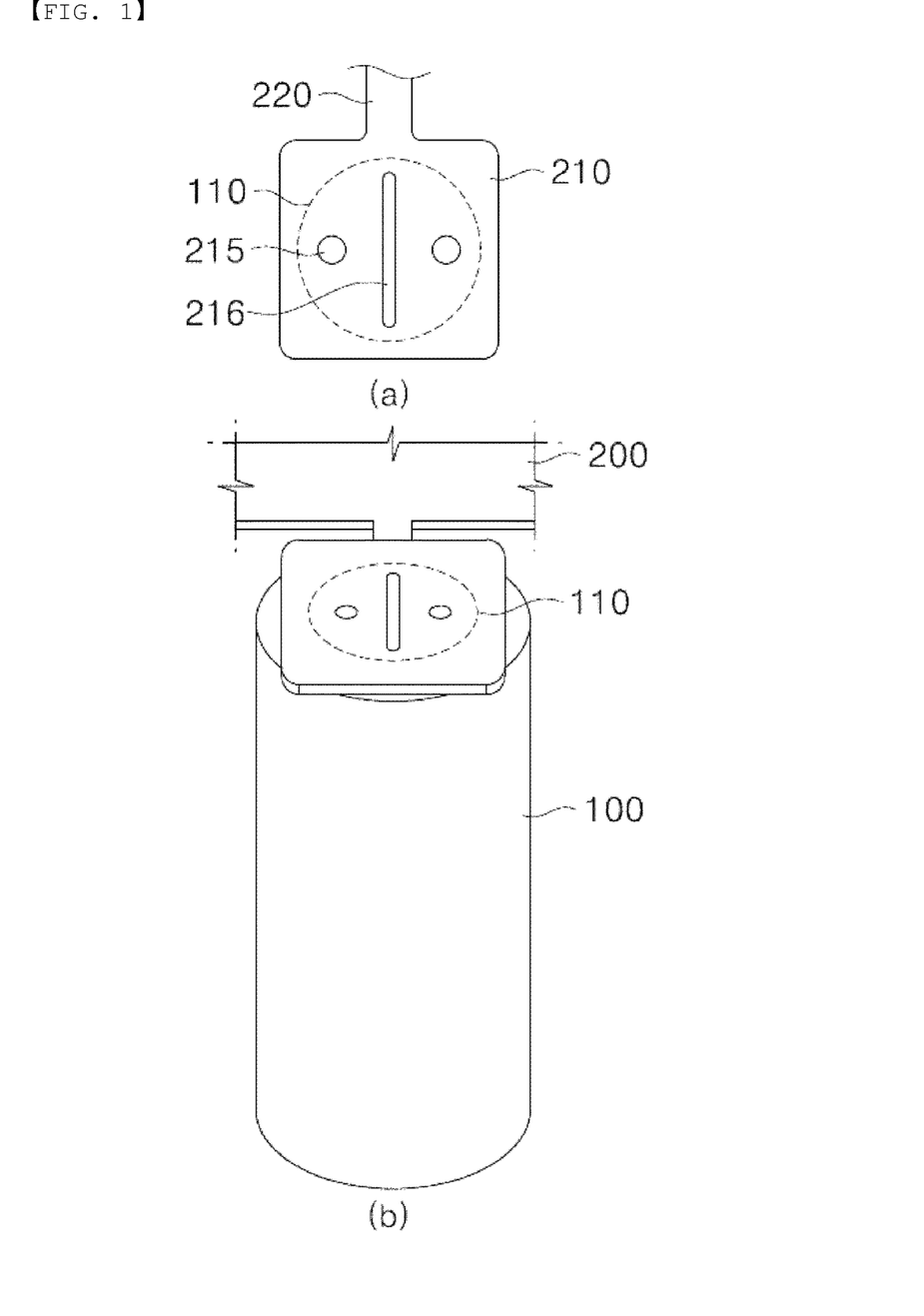
FIG. 1 shows a conventional metal plate for resistance welding, wherein (a) of FIG. 1 is a plan view thereof and (b) of FIG. 1 is a conceptual view showing the state in which the metal plate is seated on an electrode terminal at the time of welding.

That is, referring to FIG. 1, which is a conceptual view showing that a conventional metal plate for resistance welding is welded to an electrode terminal, electric power is supplied to perform resistance welding while pressing the upper part of an electrode terminal 110 of a cylindrical battery 100 and a protrusion 215 of the metal plate 200 using a welding rod (not shown).

Figure 2:
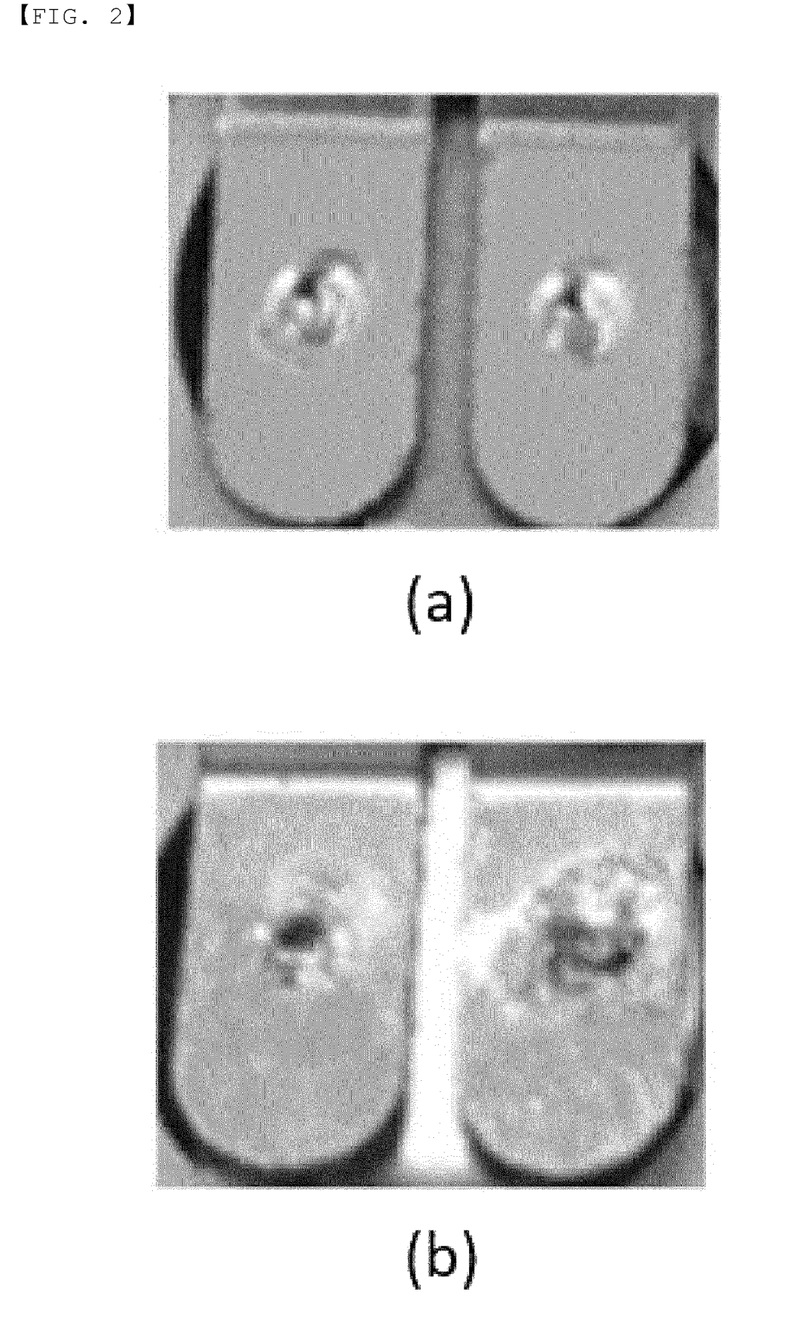
FIG. 2 shows examples of welding defects in the case in which welding is performed using the conventional metal plate for resistance welding, wherein (a) of FIG. 2 is a photograph showing under-welded or non-welded states and (b) of FIG. 2 is a photograph showing over-welded states.

However, welding defects, such as under-welding, non-welding, or over-welding, as shown in FIG. 2, occur due to various causes. In the case of such welding defects, re-welding is impossible. As a result, the cylindrical battery may be discarded, which leads to an increase in manufacturing cost.

Korean Patent Application Publication No. 2017-0135062 discloses a battery module including a plurality of battery cells, each of which includes electrode terminals, and first and second busbars made of different kinds of metals, wherein the first and second busbars are stacked, the first and second busbars are connected to the electrode terminals in order to electrically connect neighboring battery cells to each other, and each of the first and second busbars is brought into conductive contact with a corresponding one of the electrode terminals.

In the above prior art document, thermal and electrical properties of the busbars are improved while weldability of the busbars for electrically connecting different battery cells to each other is improved. However, this document does not disclose a solution when welding defects occur.

PRIOR ART DOCUMENT (Patent Document 1) Korean Patent Application Publication No. 2017-0135062

DISCLOSURE

Technical Problem

The present invention has been made in view of the above problems, and it is an object of the present invention to provide a metal plate for resistance welding configured to enable re-welding to be performed at the same position using a single metal plate even in the case in which welding defects occur and a resistance welding method using the same.

Technical Solution

In order to accomplish the above object, the present invention provides a metal plate for resistance welding, the metal plate (200) being configured to be resistance-welded to an electrode terminal (110) of a cylindrical battery (100), wherein the metal plate (200) is provided at one side surface of a body (210) thereof with a pair of protrusion units (215) located spaced apart from each other by a predetermined distance, and a slit (216) is formed between the pair of protrusion units (215).

Also, in the metal plate for resistance welding according to the present invention, each of the protrusion units (215) may include a first protrusion (215') having a predetermined diameter and a second protrusion (215") having a larger diameter than the first protrusion (215'), and central points of the first protrusion (215') and the second protrusion (215") may be located on an identical imaginary axis.

Also, in the metal plate for resistance welding according to the present invention, the body (210) may be quadrangular, and the slit (216) is located on an imaginary center line (B) configured to equally divide the width of the body.

Also, in the metal plate for resistance welding according to the present invention, the slit (216) may be formed so as to have a single closed curve shape.

Also, in the metal plate for resistance welding according to the present invention, an opening (217) extending from the slit (216) may be provided at the edge of one side of the body.

Also, in the metal plate for resistance welding according to the present invention, the pair of protrusion units (215) may be located along an imaginary center line (A) configured to equally divide the length of the body.

In addition, the present invention provides a method of welding a cylindrical battery using a metal plate for resistance welding, the method including a first step of locating a body (210) of a metal plate (200) having a first protrusion (215') and a second protrusion (215") on an electrode terminal (110) of a cylindrical battery (100) and a second step of supplying electric power while pressing a welding rod (310) such that the first protrusion (215') of the body (210) is brought into tight contact with the electrode terminal (110).

Also, the method of welding the cylindrical battery using the metal plate for resistance welding according to the present invention may further include a third step of supplying electric power while pressing the welding rod (310) such that the second protrusion (215") of the body (210) is brought into tight contact with the electrode terminal (110).

In addition, the present invention provides a cylindrical battery having the metal plate for resistance welding welded thereto.

Advantageous Effects

In a metal plate for resistance welding according to the present invention and a resistance welding method using the same, two protrusions having different diameters are successively formed on the metal plate so as to be located on the same axis. Even in the case in which primary welding defects occur, therefore, it is possible to perform re-welding at the same position.

Also, in the metal plate for resistance welding according to the present invention and the resistance welding method using the same, it is possible to perform welding twice using a single metal plate, whereby it is possible to reduce the number of parts that are discarded.

Furthermore, in the metal plate for resistance welding according to the present invention and the resistance welding method using the same, re-welding is possible even when primary welding defects occur, and therefore it is possible to reduce the number of cylindrical batteries that are discarded, whereby it is possible to reduce production cost.

BEST MODE

In the present application, it should be understood that the terms "comprises," "has," "includes," etc. specify the presence of stated features, numbers, steps, operations, elements, components, or combinations thereof, but do not preclude the presence or addition of one or more other features, numbers, steps, operations, elements, components, or combinations thereof.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, a metal plate for resistance welding according to the present invention and a resistance welding method using the same will be described.

Figure 3:
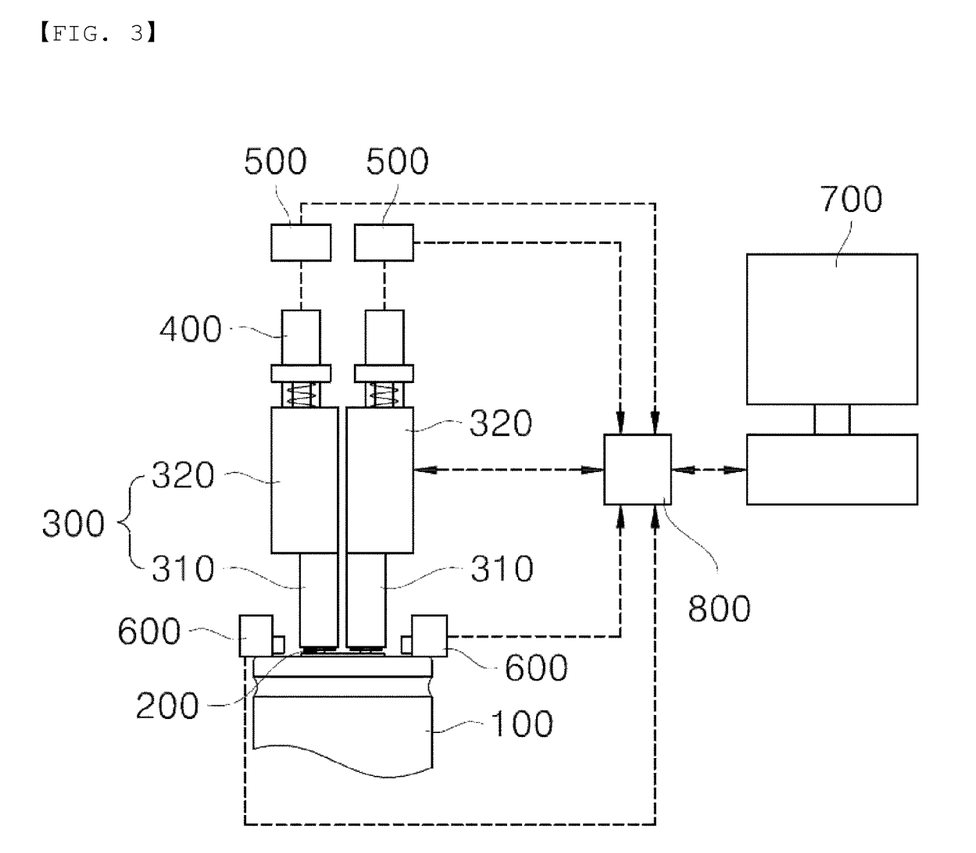
FIG. 3 is a conceptual view of a welding apparatus according to an example embodiment of the present invention.

FIG. 3 is a conceptual view of a welding apparatus according to a preferred embodiment of the present invention. Referring to FIG. 3, the cylindrical battery resistance welding apparatus according to the present invention is configured to perform resistance welding while pressing a metal plate 200 in order to electrically connect an electrode terminal 110 exposed outside a cylindrical battery 100 to an electrode terminal of another battery or to a battery circuit.

A protrusion unit 215 having a projecting structure is formed on the metal plate 200. The protrusion unit 215 is fixed to the electrode terminal 110 of the cylindrical battery 100 by welding. The construction of the metal plate 200 will be described below in detail.

The cylindrical battery welding apparatus may include a resistance welding unit 300, a pressing force measurement means 400, an indicator 500, a displacement measurement means 600, and a monitoring means 700.

The resistance welding unit 300, which is configured to weld the metal plate 200 to the electrode terminal 110 of the cylindrical battery 100, may include a welding rod 310 configured to be brought into contact with the metal plate 200, a pressing follower 320 configured to control the welding rod 310, for example to press the welding rod 310 such that the protrusion unit 215 of the metal plate 200 comes into tight contact with the electrode terminal 110, a welding controller (not shown) configured to control electricity provided to the welding rod 310 and pressing force of the pressing follower 320, and a welding jig (not shown) configured to hold the cylindrical battery 100 and the metal plate 200 in a weldable state.

Since two protrusion units 215 are formed on the metal plate 200 according to the present invention, a description of which will follow, two welding rods 310 and two pressing followers 320 are shown in FIG. 3. However, the number of welding rods 310 and pressing followers 320 to be installed may be changed depending on the number of protrusion units.

The welding rod 310 and the pressing follower 320 may be configured using a known resistance welder, and therefore a detailed description thereof will be omitted. However, it is preferable that the pressing follower 320 be configured to apply pressing force to the welding rod 310 using a spring.

Meanwhile, the welding jig (not shown) may be variously designed and configured as long as the welding jig is configured to perform position control in X-axis, Y-axis, and Z-axis directions and has a structure capable of performing welding while stably supporting the cylindrical battery 100 and the metal plate 200 in the state in which the cylindrical battery and the metal plate are in contact with each other.

However, it is preferable that the welding jig (not shown) be configured to perform welding in the state in which the cylindrical battery 100 and the metal plate 200 are disposed vertically. The reason for this is that it is possible to improve welding quality, compared to when the cylindrical battery 100 and the metal plate 200 are welded in the state of being fixed horizontally.

The pressing force measurement means 400 configured to measure pressing force of the resistance welding unit 300 at the time of welding will be described. The pressing force measurement means 400 is provided at one side of the resistance welding unit 300, and is configured to measure the pressing force at which the metal plate 200 is pressed against the electrode terminal 110 by the resistance welding unit 300.

The pressing force measurement means 400 may be constituted by a load cell connected to each pressing follower 320 of the resistance welding unit 300 to measure pressing force. The result of measurement using the load cell may be directly input to the monitoring means 700, or may be configured to indicate a pressed state through the indicator 500, which is additionally provided. Of course, it is preferable that the result of measurement using the load cell 410 be input to the monitoring means 700 even in the case in which the indicator 500 is provided.

The displacement measurement means 600 configured to measure a change in height of the protrusion unit 215 at the time of welding is provided on the side at which the cylindrical battery 100 and the metal plate 200 are welded or on the welding rod 310 side, and measures a change in height of the protrusion unit 215 of the metal plate 200 or the movement distance of the welding rod 310 at the time of welding.

In this embodiment, two protrusion units 215 are formed on one metal plate 200, whereby two weld portions are provided. Consequently, it is preferable that two displacement measurement means 600 be provided and be installed on the welding jig side or the pressing follower 320 side.

That is, during a resistance welding process, the protrusion unit 215 is melted and welded to the electrode terminal 110. The melted welding depth of the protrusion unit 215 is detected using the displacement measurement means 600, whereby the effectiveness of welding is verified in real time.

The displacement measurement means 600 may be constituted by a linear scale sensor or a linear encoder. It is preferable that the resolution of the displacement measurement means be about 0.001 mm and that measurement results be input to the monitoring means 700 in real time via a PLC.

The monitoring means 700 configured to show a welded state notifies or shows results measured by the pressing force measurement means 400 and the displacement measurement means 600 as well as the operation state of the resistance welding unit 300.

The monitoring means 700 may be constituted by a PC including a monitor. It is preferable that the monitoring means 700 be configured to display current, voltage, resistance, electric power, and energy used in the resistance welding unit 300 and values measured by the pressing force measurement means 400 and the displacement measurement means 600 such that a worker can confirm the same at the time of welding. In addition, it is preferable that the monitoring means 700 be configured to store the current, the voltage, the resistance, the electric power, and the energy used for welding through the resistance welding unit 300 and the values measured by the pressing force measurement means 400 and the displacement measurement means 600 and to statistically use or display the stored data.

In addition to the above components, a programmable logic controller (PLC) 800 configured to control a weld portion and to communicate with the monitoring means 700 and an oscilloscope configured to show various measurement results may be further provided.

Figure 4:
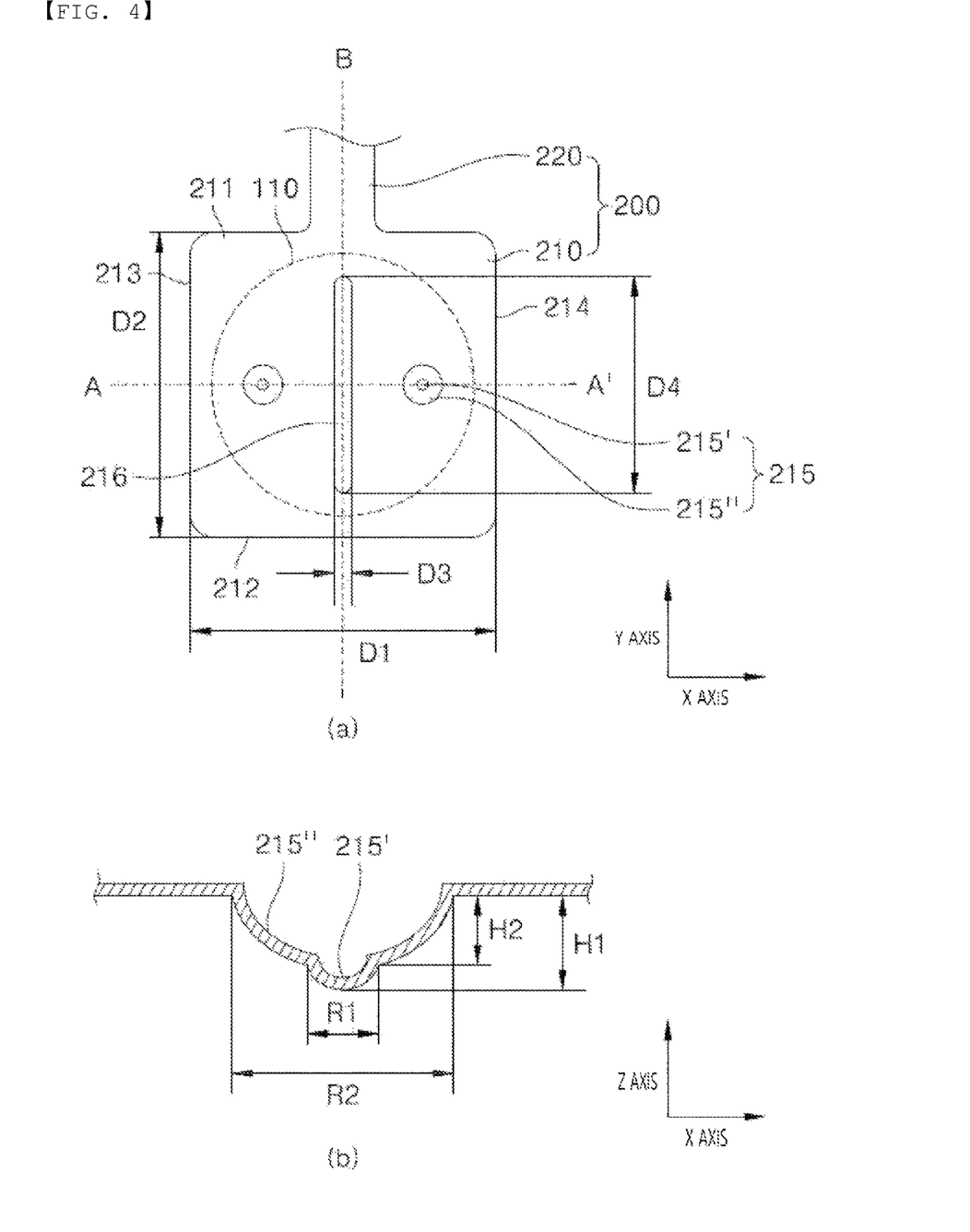
FIG. 4 shows a metal plate, where (a) of FIG. 4 is a plan view of a metal plate for resistance welding according to a first example embodiment of the present invention and (b) of FIG. 4 is an enlarged sectional view of a protrusion unit of the metal plate.

FIG. 4 shows a metal plate, where (a) of FIG. 4 is a plan view of a metal plate for resistance welding according to a first example embodiment of the present invention and (b) of FIG. 4 is an enlarged sectional view of a protrusion unit of the metal plate.

The metal plate 200 according to the present invention configured to be resistance-welded to the electrode terminal 110 of the cylindrical battery 100 includes a body 210 and a bridge 220 configured to join the body 210 to a main metal plate.

The body 210 includes a first edge 211 connected to the bridge 220, a second edge 212 located opposite the first edge 211 in parallel thereto, and a third edge 213 and a fourth edge 214 configured to connect opposite sides of the first edge 211 and the second edge 212 to each other. Consequently, the external appearance of the body 210 is approximately a quadrangle. A pair of protrusion units 215 and a slit 216 are formed at one surface of the body 210.

The pair of protrusion units 215 is located on an imaginary center line A configured to equally divide the length of the body in the Y-axis direction, and is spaced apart from each other by a predetermined distance.

Here, it is preferable that each of the protrusion units 215 have a shape in which two protrusions having different diameters are successively connected to each other. That is, each of the protrusion units 215 includes a first protrusion 215' having a predetermined diameter and a second protrusion 215" having a larger diameter than the first protrusion 215'. At this time, the central points of the first protrusion 215' and the second protrusion 215" are located on an identical imaginary axis (Z axis).

Only a single protrusion is provided on a conventional metal plate for welding. In the case of welding defects, such as under-welding, non-welding, or over-welding, therefore, a corresponding cylindrical battery must be discarded. In the metal plate according to the present invention, however, two protrusions having different diameters are successively formed on the same axis. In the case in which welding using the first protrusion 215' is defective, therefore, re-welding or additional welding can be performed at the same position using the second protrusion 215". Consequently, it is possible to remarkably reduce the number of cylindrical batteries that are discarded.

The slit 216 is located between the pair of protrusion units 215. Specifically, the slit 216 is located on an imaginary center line B configured to equally divide the width of the body, and is formed in a single closed curve shape having a predetermined width and length.

The slit 216 reduces so-called null current distribution, which is leakage of some of welding current, and therefore it is possible to reduce the amount of energy necessary at the time of welding.

Meanwhile, it is preferable that the length D2 and the width D1 of the body 210 having a thickness of 1.5 to 3.0 mm be 7 to 9 mm and 7 to 9 mm, respectively, and that the length D4 and the width D3 of the slit 216 be 5.5 to 6.5 mm and 0.5 to 0.7 mm, respectively.

In addition, the diameter R1 of the first protrusion 215' and the diameter R2 of the second protrusion 215" are 0.8 to 1.2 mm and 1.3 to 1.7 mm, respectively.

Furthermore, it is preferable that the height H1 from the surface of the body 210 to the first protrusion 215' and the height H2 from the surface of the body 210 to the second protrusion 215" be 0.2 mm and 0.2 mm, respectively.

The metal plate 200 having the above construction may be made of Cu (for example, C1100) or a Cu alloy (for example, an alloy having a Cu content of 90% or more, such as C18145, C19025, or C19170).

Figure 5:
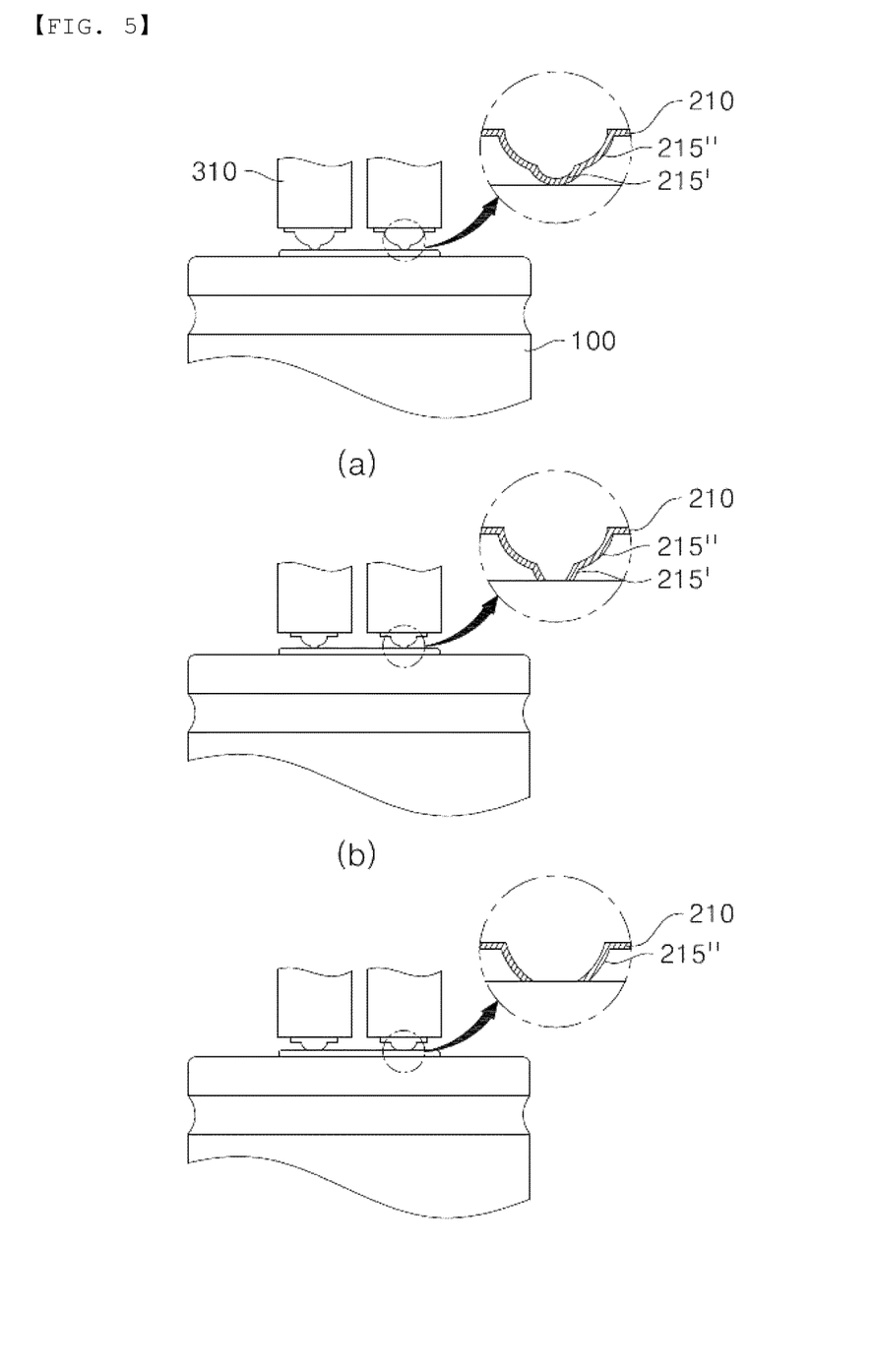
FIG. 5 is a conceptual view illustrating a method of welding the metal plate for resistance welding according to the first example embodiment of the present invention to an electrode terminal.

FIG. 5 is a conceptual view illustrating a method of welding the metal plate for resistance welding according to the first preferred embodiment of the present invention to the electrode terminal.

The welding method will be described with further reference to FIG. 3, which is a conceptual view of the welding apparatus, and FIG. 4, which shows the metal plate for resistance welding according to the present invention. The welding method according to the present invention may include a first step of locating the body 210 of the metal plate 200 having the first protrusion 215' and the second protrusion 215" on the electrode terminal 110 of the cylindrical battery 100, a second step of supplying electric power while pressing the welding rod 310 such that the first protrusion 215' of the body 210 is brought into tight contact with the electrode terminal 110, and a third step of supplying electric power while pressing the welding rod 310 such that the second protrusion 215" of the body 210 is brought into tight contact with the electrode terminal 110 as needed.

Specifically, in the first operation of (a) of FIG. 5, the cylindrical battery 100 and the metal plate 200 are supported and fixed using the welding jig 330. At this time, it is preferable, but not required that the electrode terminal 110 of the cylindrical battery 100 and the first protrusion 215' of the body 210 of the metal plate 200 be in contact with each other. The welding rod 310 of the resistance welding unit 300 is located on the body 210.

In the second operation of (b) of FIG. 5, resistance welding is performed using the resistance welding unit 300 while electricity is applied to the contact portion between the electrode terminal 110 and the first protrusion 215'. At this time, in order to perform normal welding, welding must be performed based on a set displacement while appropriate pressing force and energy are provided.

As an example, voltage at the time of welding may range from 2.5 to 5.0 V, welding time may range from 3 to 5 ms, and pressing force may range from 2.5 to 3.5 kgf.

Meanwhile, a weld region may be defective due to various causes, for example in the case in which the welding condition deviates from a setting value or in the case in which unintentional foreign matter exists between the body 210 and the electrode terminal 110 or between the body 210 and the welding rod 310.

In this case, secondary resistance welding is performed while electricity is applied to the contact portion between the electrode terminal 110 and the second protrusion 215" as shown in (c) of FIG. 5.

Figure 6:
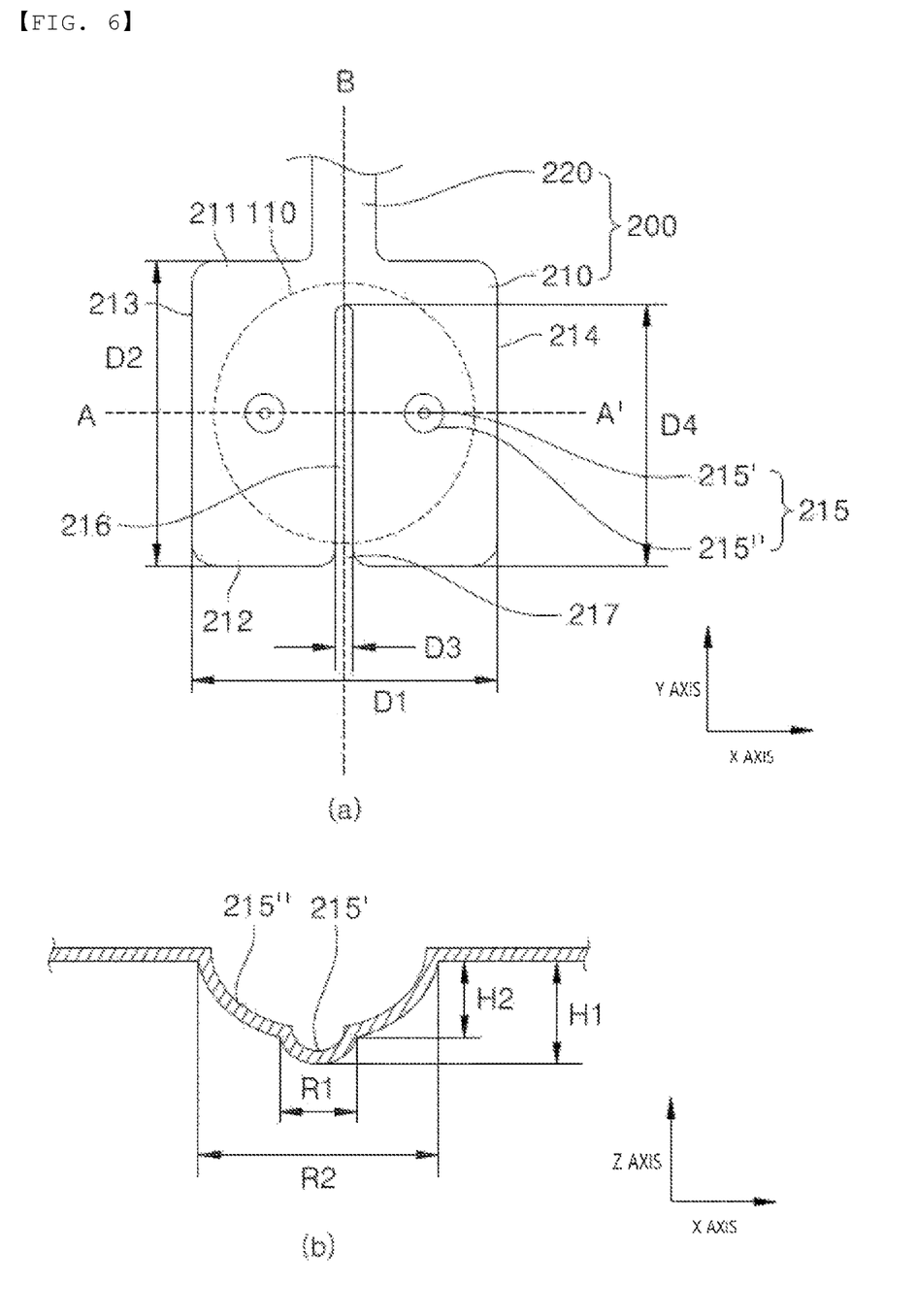
FIG. 6 shows a metal plate, where (a) of FIG. 6 is a plan view of a metal plate for resistance welding according to a second example embodiment of the present invention and (b) of FIG. 6 is an enlarged sectional view of a protrusion unit of the metal plate.

FIG. 6 shows a metal plate, where (a) of FIG. 6 is a plan view of a metal plate for resistance welding according to a second example embodiment of the present invention and (b) of FIG. 6 is an enlarged sectional view of a protrusion unit.

The second embodiment of the present invention is identical to the first embodiment described above except for the shape of the slit 216, and therefore a repeated description will be omitted and only the slit 216 will be described.

The slit 216 formed in the body 210 has an opening 217 formed in a direction opposite the bridge 220, i.e. at the second edge 212. Consequently, it is possible to further reduce null current distribution.

Although the specific details of the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and the technical idea of the present invention, and it will be obvious that such changes and modifications fall within the scope of the appended claims.

DESCRIPTION OF REFERENCE SYMBOLS

100: Cylindrical battery
110: Electrode terminal
200: Metal plate
210: Body
211: First edge 212: Second edge
213: Third edge 214: Fourth edge
215: Protrusion unit
215': First protrusion 215": Second protrusion
216: Slit 217: Opening
220: Bridge
300: Resistance welding unit
310: Welding rod
320: Pressing follower
400: Pressing force measurement means
500: Indicator
600: Displacement measurement means
700: Monitoring means
800: PLC
A: Imaginary center line configured to equally divide length of body
B: Imaginary center line configured to equally divide width of body
D1: Width of body D2: Length of body
D3: Width of slit D4: Length of slit
R1: Diameter of first protrusion R2: Diameter of second protrusion
H1: Height to first protrusion H2: Height of second protrusion

The invention claimed is:

1. A metal plate for being resistance-welded to an electrode terminal of a cylindrical battery, the metal plate comprising:
    a body; and
    a pair of protrusion units located spaced apart from each other by a predetermined distance, the pair of protrusion unit being provided at one side surface of the body, and
    a slit is formed between the pair of protrusion units, wherein,
    each of the protrusion units comprises a first protrusion having a predetermined diameter and a second protrusion having a larger diameter than the predetermined diameter of the first protrusion, and
    central points of the first protrusion and the second protrusion are located on an identical imaginary axis.

2. The metal plate according to claim 1, wherein,
    the body is quadrangular, and
    the slit is located on an imaginary center line configured to equally divide a width of the body.

3. The metal plate according to claim 2, wherein the slit is formed so as to have a single closed curve shape.

4. The metal plate according to claim 2, wherein an opening extending from the slit is provided at an edge of one side of the body.

5. The metal plate according to claim 1, wherein the pair of protrusion units is located along an imaginary center line configured to equally divide a length of the body.

6. A method of welding a cylindrical battery using the metal plate according to claim 1, the method comprising:
    a first operation of locating the body of the metal plate having the first protrusion and the second protrusion on the electrode terminal of the cylindrical battery; and
    a second operation of supplying electric power while pressing a welding rod such that the first protrusion of the body is brought into contact with the electrode terminal.

7. The method according to claim 6, further comprising a third operation of supplying electric power while pressing the welding rod such that the second protrusion of the body is brought into contact with the electrode terminal.

8. A cylindrical battery having the metal plate according to claim 1 welded thereto.

9. The metal plate according to claim 1, wherein the first protrusion is located farther from the body than the second protrusion.

* * * * *